United States Patent
Batarseh et al.

(10) Patent No.: US 6,836,414 B1
(45) Date of Patent: Dec. 28, 2004

(54) PWM HALF-BRIDGE CONVERTER WITH DUAL-EQUALLY ADJUSTABLE CONTROL SIGNAL DEAD-TIME

(75) Inventors: Issa Batarseh, Oviedo, FL (US); Hong Mao, Orlando, FL (US); Jaber A. Abu Qahouq, Orlando, FL (US)

(73) Assignee: University of Central Florida, Orlando, FL (US)

( * ) Notice: Subject to any disclaimer, the term of this patent is extended or adjusted under 35 U.S.C. 154(b) by 95 days.

(21) Appl. No.: 10/272,719

(22) Filed: Oct. 17, 2002

(51) Int. Cl.[7] .............................................. H02M 3/335
(52) U.S. Cl. ..................... 363/17; 363/132; 363/56.02
(58) Field of Search ...................... 363/17, 132, 56.02, 363/56.03, 56.04, 56.05

(56) References Cited

U.S. PATENT DOCUMENTS

| | | | |
|---|---|---|---|
| 3,938,024 A | 2/1976 | Clarke | 321/2 |
| 4,959,765 A | 9/1990 | Weinberg | 363/20 |
| 5,140,509 A | 8/1992 | Murugan | 363/17 |
| 5,140,512 A | 8/1992 | O'Sullivan | 363/24 |
| 5,159,541 A | 10/1992 | Jain | 363/26 |
| 5,218,522 A | 6/1993 | Phelps et al. | 363/124 |
| 5,245,520 A | 9/1993 | Imbertson | 363/17 |
| 5,255,174 A | 10/1993 | Murugan | 363/17 |
| 5,325,283 A | 6/1994 | Farrington et al. | 363/21 |
| 5,438,500 A | 8/1995 | Ohms | 363/24 |
| 5,663,873 A | 9/1997 | Bhagwat et al. | 363/20 |
| 5,694,304 A | 12/1997 | Telefus et al. | 363/21 |
| 5,729,444 A | 3/1998 | Perol | 363/25 |
| 5,754,413 A | 5/1998 | Fraidlin et al. | 363/13 |
| 5,808,879 A | 9/1998 | Liu et al. | 363/17 |
| 5,892,666 A | 4/1999 | Gucyski | 363/24 |
| 5,895,983 A | 4/1999 | Motomura | 307/106 |
| 6,016,258 A | 1/2000 | Jain et al. | 363/17 |
| 6,115,273 A | * 9/2000 | Geissler | 363/89 |
| 6,310,785 B1 | 10/2001 | Ayyanar et al. | 363/17 |
| 6,545,883 B2 | * 4/2003 | Xing et al. | 363/21.11 |

* cited by examiner

*Primary Examiner*—Shawn Riley
(74) *Attorney, Agent, or Firm*—Brian S. Steinberger; Law Offices of Brian S. Steinberger P.A.

(57) ABSTRACT

A method and system of controlling half-bridge DC—DC converters to achieve Zero Voltage Switching (ZVS) for at least one of the switches. The soft-switching half-bridge DC—DC converter system includes soft-switching for all switches by adding an additional branch with a switch and a diode across the primary side of an isolation transformer and by applying a Duty-Cycle Shifted PWM Control.

19 Claims, 6 Drawing Sheets

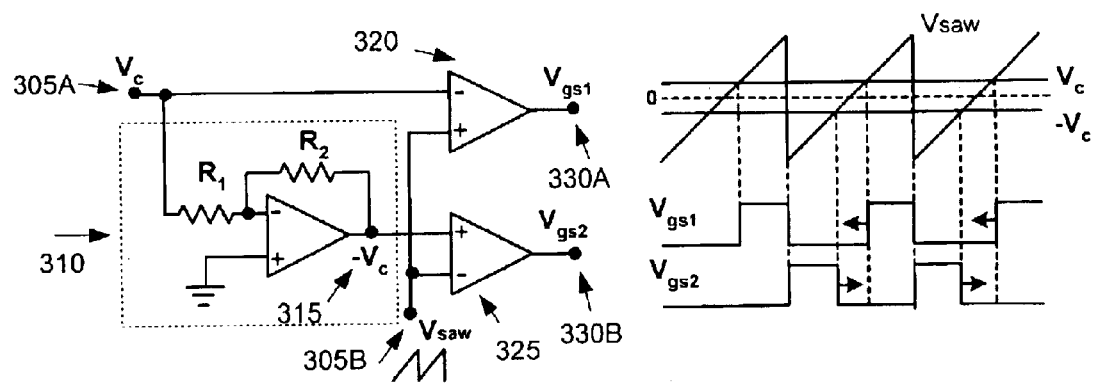
Fig. 3
Fig. 3(a)
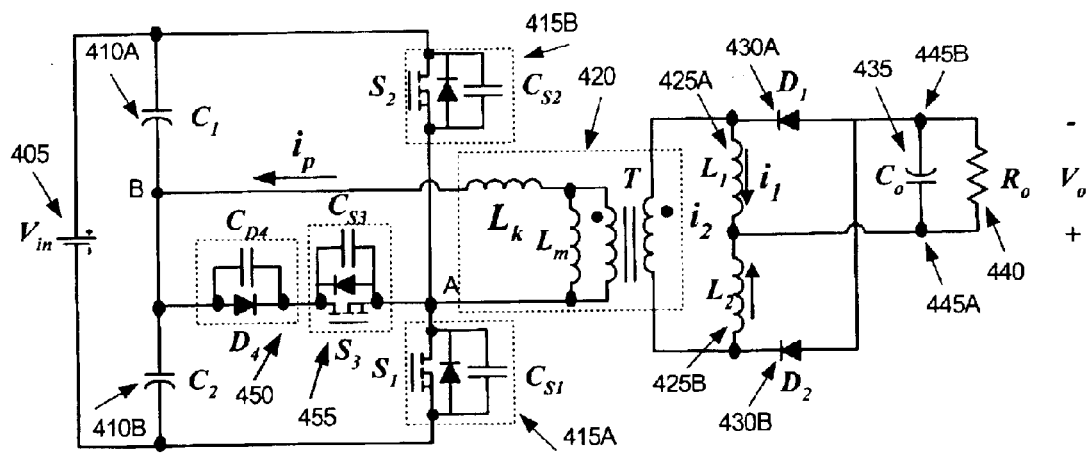
Fig. 4

PWM HALF-BRIDGE CONVERTER WITH DUAL-EQUALLY ADJUSTABLE CONTROL SIGNAL DEAD-TIME

FIELD OF THE INVENTION

This invention is related to half-bridge direct current-direct current (DC—DC) converter power supplies and more particularly, to a new duty-cycle shifted Pulse Width Modulation (PWM) control scheme for half-bridge DC—DC converters to achieve Zero-Voltage-Switching (ZVS), and to a novel improved half-bridge ZVS DC—DC converter.

BACKGROUND AND PRIOR ART

With the increasing demand for higher power density in DC—DC conversion with much improved dynamic performance, converter switching frequency continues to increase to reduce the size and cost of passive components. However, with increased switching frequency, a soft switching operation becomes more desirable to reduce the increased switching losses. For isolated DC—DC converters, the phase-shifted full-bridge topology can achieve Zero-Voltage Switching (ZVS) for its four primary-side switches without adding additional switches, and the leakage inductance of transformer and junction capacitance of the Metal-Oxide Semiconductor Field-Effect Transistors (MOSFET) are rationally utilized to achieve soft switching without penalties. See R. Redl, N. O. Sokal, L. Balogh, "A novel soft-switching full-bridge converter: analysis, design considerations, and experimental results at 1.5 kW, 100 kHz", IEEE Power Electronics Specialists Conference Records, 1990, pp.162–172. For high-input-current DC—DC converters, full bridge is preferred owing to lower current stresses, good magnetic core utilization and no leakage inductance related ringing and losses. However, the complexity of the full-bridge is almost highest among the conventional topologies due to its large number of switches, and ZVS switching cannot be achieved at light load. See Praveen K. Jain; Harpreet Soin, "full bridge DC—DC Converter", 2000 U.S. Pat. No. 6,016,258.

Active-clamp forward topology is another typical example to realize ZVS by utilizing the transformer leakage inductance, magnetizing inductance and MOSFETs junction capacitances. See Cobos, J. A.; Garcia, O.; Uceda, J.; Sebastian, J.; de la Cruz, E., "Comparison of high efficiency low output voltage forward topologies", Power Electronics Specialists Conference, PESC '94 Record., 25th Annual IEEE, 1994, pp. 887–894. Since the magnetic core is not symmetrically utilized due to leakage inductance, the topology requires a larger transformer.

The conventional half-bridge topology has the same number of switches as active-clamp forward topology but has better transformer utilization. The conventional symmetric PWM half-bridge topology is a popular approach for medium power level applications even though both primary switches operate at a hard switching condition, which limits the switching frequency due to increased switching losses. The complementary (asymmetric) control has been successfully applied to half-bridge DC—DC converters to achieve ZVS for both the high-side switch and low-side switch using the magnetizing current and the output inductor currents. See Pradeep Madhav Bhagwat, "Bias power having a gapped transformer component" U.S. Pat. No. 5,663,873, 1997; and P. Imbertson and N. Mohan, "Asymmetrical duty cycle permits zero switching loss in PWM circuits with no conduction loss penalty," IEEE Transaction on Power Electronics, Vol.29, No.1, pp.121–125, 1993. Unfortunately, this scheme leads to asymmetric disadvantages because the two switches operate at different width of duty cycles. See Weiyun Chen; Peng Xu; Lee, F. C., "The optimization of asymmetric half bridge converter", Applied Power Electronics Conference proceedings, 2001, pp. 703–707. The voltages across the leg's capacitors are not identical which result in both the current stresses on the primary-side switches and the voltage and current stresses on the secondary-side rectifiers being not identical. This condition requires the use of higher voltage rate rectifiers that in turn degrades the rectification efficiency due to the higher voltage drop and higher reverse recovery losses. Moreover, because the DC voltage gain of the converter is nonlinear, for the same input voltage deviation, a larger duty cycle range is needed, resulting in further degrading in the converter performance. As a result, this asymmetric control is not suited for wide input voltage range applications such as 36V–75V input Telecom modules.

To reduce the duty cycle variation range and voltage stresses applied to rectifiers, an asymmetric winding structure was proposed. See Simon, Fraidlin, Valery I. Meleshin, "Reduced voltage stress asymmetrical DC-to-DC converter using first and second transformers having differing turns ratios" U.S. Pat. No. 5,754,413. (1998), which is said to allow the use of lower voltage rate rectifiers to improve the efficiency. Unfortunately, the asymmetric power delivering is still a problem that limits the power delivering efficiency. See Weiyun Chen; Peng Xu; Lee, F. C., "The optimization of asymmetric half bridge converter", Applied Power Electronics Conference proceedings, 2001, pp. 703–707.

Asymmetric half-bridge is not suitable for wide input voltage range due to asymmetric voltage and current stress. The symmetric control scheme for half-bridge has no asymmetric penalties; but the switches operate at a hard switching condition leading to undesirable switching losses and lower efficiency.

SUMMARY OF THE INVENTION

It is an important object of this invention to provide a novel control system for half-bridge DC—DC converters to achieve zero-voltage switching (ZVS).

It is a further object of this invention to provide a soft switching operation for half-bridge DC—DC converters to reduce the switching losses and transformer leakage inductance related losses without asymmetric penalties.

It is a further object of this invention to provide a novel half-bridge DC—DC converter for improved fidelity, higher efficiency, and reliability.

It is a further object of this invention to provide a new soft-switching topology that achieves soft-switching for all the switches of the topology.

According to the invention, there is provided a method of driving a half bridge DC—DC converter comprising means for duty cycle shifted control whereby zero-voltage-switching (ZVS) operation is possible and a new soft-switching DC—DC converter that can achieve soft-switching for all its switches comprising an additional switching network across the input of the isolation transformer of the half bridge.

Further objects and advantages of this invention will be apparent from the following detailed description of a presently preferred embodiment which is illustrated schematically in the accompanying drawings.

BRIEF DESCRIPTION OF DRAWINGS

Details of the invention, and of preferred embodiments thereof, will be further understood upon reference to the drawings, wherein:

FIG. 3 shows an example of the Modulation Circuits and Waveforms for Duty-Cycle-Shifted PWM Control of the Invention.

FIG. 3(a) shows the voltage waveforms of FIG. 3.

FIG. 4 shows the ZVS Half-Bridge DC—DC Converter-Topology of the Invention.

DETAILED DESCRIPTION OF PREFERRED EMBODIMENTS

Before explaining the disclosed embodiments of the present invention in detail, it is to be understood that the invention is not limited in its application to the details of the particular arrangements shown since the invention is capable of other embodiments. Also, the terminology used herein is for the purpose of description and not of limitation.

The invention as disclosed herein involves two schemes or topologies: (1) A new control scheme to be known as "Duty-Cycle Shifted PWM Control" to be applied to the half-bridge DC—DC converter to achieve ZVS for one of the switches without adding extra components and without adding asymmetric penalties of complementary control. The concept of this new control scheme is shifting one of the two-channel symmetric PWM driving signals close to each other, while keeping the pulse-width-modulation (PWM) control mode. As a result, ZVS may be achieved because one switch turns on just after the other switch is turned off. Moreover, because the width of the two switches duty cycles is kept equal, all corresponding components work at even conditions with even stresses as the case in the symmetric control scheme; and (2) a new full Zero-Voltage-Switching (ZVS) half-bridge DC—DC converter topology where ZVS is achieved for all switches by adding additional branch with a switch across the isolation transformer primary side and by applying the Duty-Cycle Shifted PWM Control of the invention. The novel half-bridge direct current to direct current (DC—DC) converter topology comprises: means for receiving an input voltage (Vin); means for outputting an output voltage (Vo); two input capacitors; an upper switch connected to one of said input capacitors and a lower switch connected to the other of said input capacitors; a magnetic isolation transformer connected between said means for receiving an input voltage (Vin) input voltage and means for outputting an output voltage (Vo); and, a secondary rectification circuit which bridges across said two input capacitors.

It would be useful to define the meanings of words and phrases used herein and their applications before discussing the novel control means and improved half-bridge power supply of the invention including:

Zero-Voltage Switching (ZVS) is to shape the voltage waveform across switch and force it to drop to zero before turning ON that switch to eliminate or minimize the turn ON losses of the switch;

Zero-Current Switching (ZCS) is to shape the current waveform through the switch and force it to drop to zero before turning OFF that switch to eliminate or minimize the turn OFF losses of the switch;

soft-switching is to Turn ON or OFF the switch at ZVS or ZCS or both;

hard-switching is when the switch is not turned on or off at ZVS or ZCS;

and, switches can be MOSFETs (Metal-Oxide Semiconductor Field-Effect Transistor) and each has an internal body diode and junction capacitor.

Figure 1:
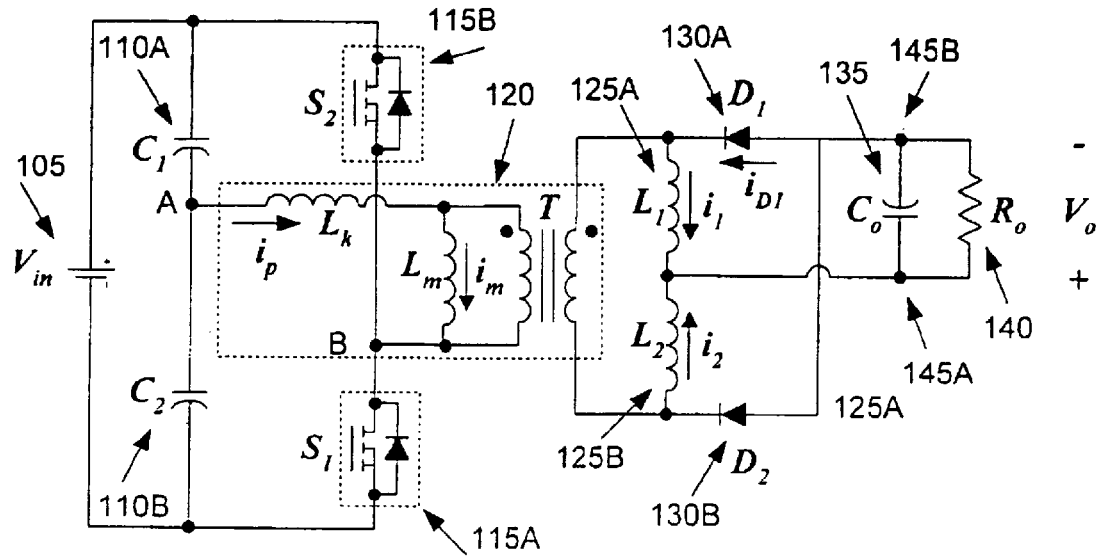
FIG. 1 Illustrates a schematic Illustrative of the Conventional Half-Bridge DC—DC Converter with the Current Doubler Rectifier.

Reference should be made now to FIG. 1 that shows the conventional half-bridge DC—DC converter with a prior art current doubler rectifier. This conventional half-bridge converter consists of a primary side part and a secondary side part, both coupled by isolation transformer T 120 of element 120, and has input voltage Vin 105 and output voltage Vo between nodes 145A and 145B. The primary side consists of two switch elements $S_1$ of element 115A and $S_2$ of element 115B and two capacitor elements $C_1$ 110A and $C_2$ 110B. The two primary switches and the two capacitors are connected in half bridge configuration as shown in FIG. 1. $L_m$ and $L_k$ represent the magnetizing inductance and leakage inductance of element 120 or T 120, respectively. The secondary side can be connected in several configurations such as a center-tapped configuration, a full-bridge configuration, and a current doubler configuration. The discussion in this disclosure will consider the half-bridge with a current doubler secondary side for the example and not for limitation. The secondary side current doubler as shown in FIG. 1 consists of two switch elements 130A and 130B with diodes $D_1$ and $D_2$ as used in FIG. 1, two inductor elements $L_1$ 125A and $L_2$ 125B, an output capacitor $C_o$ 135 and load $R_o$ 140.

Figure 2:
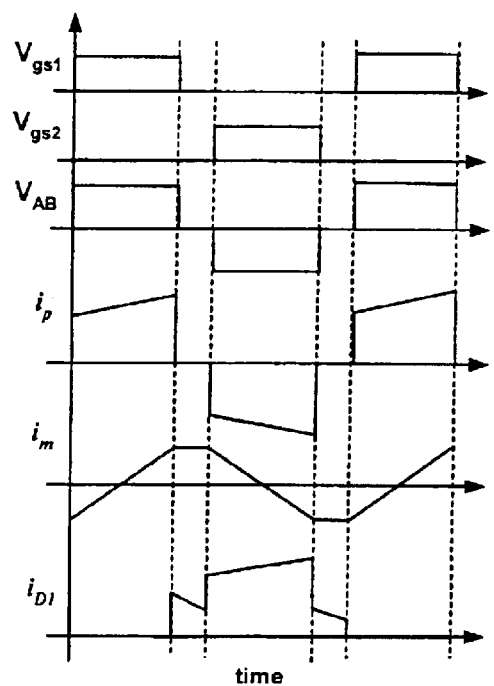
FIG. 2(a) shows the Waveforms of the Half-Bridge Isolated Converter with Conventional Symmetric Control.
FIG. 2(b) shows the Waveforms of the Half-Bridge Isolated Converter with the Duty-Cycle-Shifted Control of the Invention.
Figure 2:
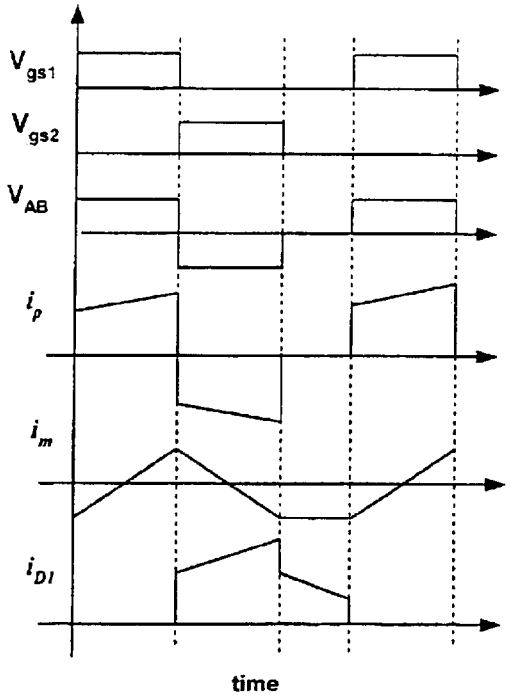

Different half bridge topologies can be generated using different control schemes to control switches $S_1$ 115A and $S_2$ 115B of FIG. 1. One of the prior art control (driving) schemes is the conventional symmetric control scheme with its related waveforms shown in FIG. 2(a) when applied to the half bridge of FIG. 1. In FIG. 2 (a, b), $V_{gs1}$ and $V_{gs2}$ are the control signals for $S_1$ 115A and $S_2$ 115B, respectively where logic 1 or high indicates that the switch is turned ON while logic 0 or low indicates that the switch is turned OFF. $V_{AB}$ is the voltage across the primary side between nodes A and B of the isolation transformer T 120. $i_p$ is the transformer primary current and $i_m$ is the transformer magnetizing inductance current in the direction shown in FIG. 1. $i_{D1}$ is the forward current through rectifier diode $D_1$ 130. When using the conventional symmetric control scheme of FIG. 2(a) to control the half-bridge of FIG. 1, $S_1$ 115A and $S_2$ 115B are turned ON and OFF at hard-switching causing large switching losses that are proportional to the switching frequency. Besides the hard switching, the conventional symmetric control has a leakage-inductance-related disadvantage. During off-time period when both switches are off, energy stored in the transformer leakage inductance can be recycled to primary DC side through the body diode of the switches. But because of the reverse recovery current of the body diode, the oscillation between the transformer leakage inductance and the MOSFET junction capacitance is significant in the primary side. To suppress the ringing, traditionally snubber circuits are necessarily added but the losses dissipated in the snubber become dramatically large, especially at high input current and at high switching frequency.

FIG. 2(b) shows the key waveforms of the novel duty-cycle-shifted control of the invention disclosed herein. Based on the conventional symmetric duty cycle, $S_2$ 115B driving signal $V_{gs2}$ is shifted left close to the driving signal $V_{gs1}$ of $S_1$ 115A as shown in FIG. 2(b). When $S_1$ 115A is turned OFF, the leakage inductor $L_k$ current and reflected inductor current charge and discharge junction capacitors of $S_1$ 115A and $S_2$ 115B. After the voltage across $S_2$ 115B drops to zero, the body diode of $S_2$ 115B conducts to carry current. During the body diode conduction period, $S_2$ 115B may be turned on with ZVS. No ringing occurs during the transition period. Moreover, the opposite shifting is possible to achieve the ZVS for $S_1$ 115A instead of $S_2$ 115B by shifting $V_{gs1}$ of S1 115A left close to the driving signal $V_{gs2}$ of S2 115B.

FIG. 3 shows a modulation approach for the realization of duty-cycle-shifted PWM control as an example and not for limitation with FIG. 3(a) showing the voltage waveforms of FIG. 3. The modulation circuit of FIG. 3 has two input nodes 305A and 305B and two output nodes 330A and 330B. The voltage Vc at node 305A is inverted to −Vc at node 315B by circuit module 310. The voltage Vc at node 305A is compared to the Voltage Vsaw, which is the saw carrier waveform for modulation, at node 305B to generate control signal $V_{gs1}$ at node 330A via element 320. The voltage −Vc at node 315 is compared to the Voltage Vsaw at node 305B to generate control signal $V_{gs2}$ at node 330B via element 325.

By modulating Vc and −Vc, driving signals for $S_1$ 115A and $S_2$ 115B can be generated, respectively. Because the falling time of the saw waveform is small, the falling edge of $S_1$ 115A is always close to the rising edge of $S_2$ 115B, which guarantees the ZVS for $S_2$ 115B (or ZVS for $S_1$ 115A if applied by opposite manner). This modulation method differs from the conventional PWM method by the fact that the direction of variation of the two duty cycles is opposite as shown in FIG. 3 by the arrows. In other words, since Vc and −Vc are symmetrically centered around zero, the duty cycle of $S_1$ 115A is regulated by moving its rising edge left and right, while the duty cycle of $S_2$ 115B is regulated by moving its falling edge right and left, keeping $S_1$ 115A and $S_2$ 115B with the same duty cycle.

Reference should be made now to FIG. 4, which shows the Zero-Voltage-Switching Half-Bridge DC—DC Converter Topology of the Invention. The converter topology of FIG. 4 is based on the half bridge topology of FIG. 1 with an additional branch having a switch across the isolation transformer primary side added to it.

The topology of FIG. 4 consists of a primary side with an input voltage Vin of element 405, a secondary side with output voltage Vo between nodes 445A and 445B and isolated by isolation transformer T 420. $L_m$ and $L_k$ are the magnetizing inductance and leakage inductance of the isolation transformer T 140, respectively. The primary side consists of a half bridge and the additional switching network that makes it novel. This switching network consists of elements 450 and 455. Element 455 contains an active switch $S_3$ 455 with its body diode and junction capacitor or extra capacitor across switch and element 450 is diode $D_4$ with its junction capacitor or extra capacitor across the diode. Capacitors $C_{s1}$, $C_{s2}$, $C_{S3}$ and $C_{D4}$ may include the total capacitance of the junction capacitance and the added capacitance of housing elements 415A, 415B, 455 and 450, respectively. The additional switching network is connected between nodes A and B across the primary side of the isolation transformer T 420 as shown in FIG. 4.

The secondary side can be connected in several configurations such as a center-tapped configuration, a full-bridge configuration and a current doubler configuration. The discussion in this invention will consider the half-bridge with current doubler secondary side as exemplary and not as a limitation. The secondary side current doubler as shown in FIG. 1 consisted of two switch elements 130A and 130B where diodes $D_1$ and $D_2$ are used in FIG. 1, two inductor elements 125A and 125B named as $L_1$ and $L_2$ respectively, output capacitor element 135A named $C_o$, and a load element 140 named $K_o$.

In the topology of FIG. 4, the above referenced components have the same structure except that each is of the 400 series, e.g., in FIG. 4 $R_o$ is identified as 440. Referring again back to FIG. 1, ZVS of switch $S_2$ is achieved by using the duty-cycle-shifted control scheme of this invention described earlier in this invention description. However, switch $S_1$ 115A still operates at hard-switching condition. To achieve ZVS for $S_1$ 115A, the novel additional switching network of elements 440 and 455 as shown in FIG. 4 is introduced into the circuitry of the half-bridge of FIG. 1. This will result in a topology with three switches, all of them, $S_1$ 115A, $S_2$ 115B, and $S_3$ 115A with ZVS operation and surprisingly $S_3$ also works under the ZCS operation.

Figure 5:
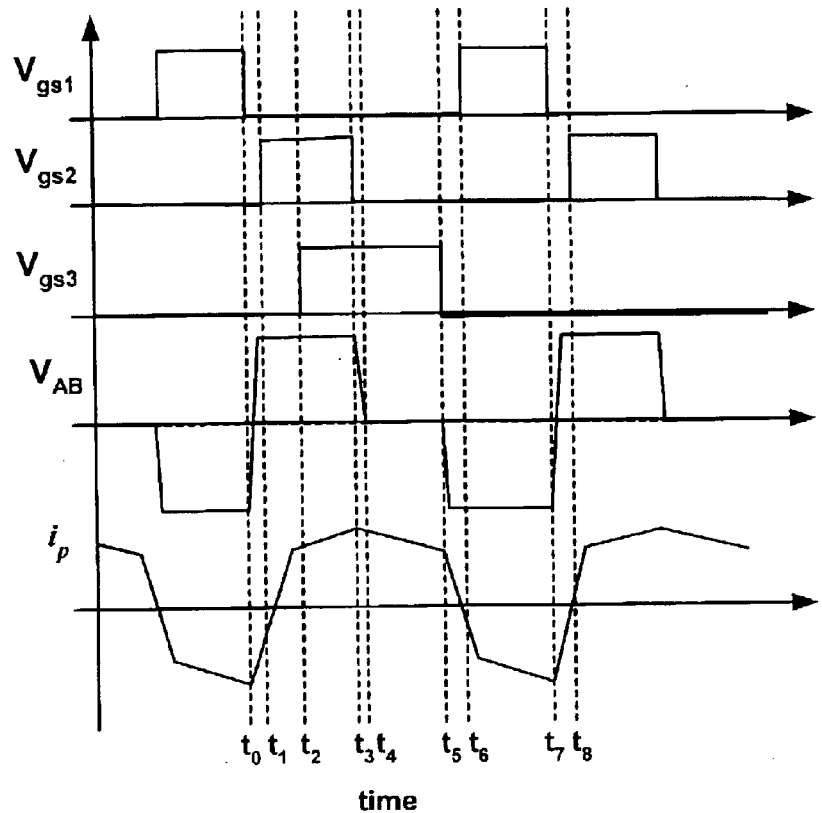
FIG. 5 illustrates the Waveforms of the ZVS Half-Bridge DC—DC Converter Topology of the Invention.

FIG. 5 shows the driving scheme of the FIG. 4 invention topology and its main waveforms. In FIG. 5, $V_{gs1}$ and $V_{gs2}$ are the control signals for $S_1$ and $S_2$ respectively and $V_{gs3}$ is the control signal for $S_3$ of the additional network, where logic 1 or high indicates that the switch is turned ON while logic 0 or low indicates that the switch is turned OFF. $i_p$ is the transformer primary current in the direction shown in FIG. 5. $V_{AB}$ is the voltage across the isolation transformer T primary side between nodes A and B.

The soft-switching operation is described as follows: Energy stored in leakage inductance $L_k$ of the isolation transformer T can be used to discharge the junction capacitances of the switches to achieve ZVS. Switch $S_3$ and diode $D_4$ are added to provide a path for the leakage inductance current during the period when both $S_1$ and $S_2$ are OFF, to be called OFF-time interval. In other words, leakage inductance stored energy is trapped during the OFF-time interval until it is needed. As shown in FIG. 5, before $S_1$ is turned ON, $S_3$ is turned OFF to release the trapped energy in the leakage inductance to discharge capacitance voltage across $S_1$ furthermore creating ZVS for the switch $S_1$.

To simplify the description of the operation of FIG. 4 topology, the operation can be divided into several modes of operation. Referring to FIG. 5 in addition to FIG. 4, the main modes of operation can be described as follows:

Mode 1 [$t_0, t_1$]: Before this interval ($t<t_0$), $S_1$ was ON, the transformer primary current $i_p$ was positive, and the secondary side diode $D_1$ was reverse-biased. At $t=t_0$, S1 is turned OFF, causing the current $i_p$ to charge $C_{s1}$ and discharge $C_{s2}$, the capacitors of $S_1$ and $S_2$ respectively. When the voltage across $C_{s2}$ is discharged to zero, the body diode of $S_2$ conducts to carry the current, which provides ZVS condition for switch $S_2$. During this period, secondary side current $i_1$ and $i_2$ freewheel through $D_1$ and $D_2$, respectively.

Mode 2 [$t_3, t_5$]: $S_1$ is turned ON with ZVS at $t=t_1$, which causes the transformer leakage inductance current to reset to zero and reverse-charged. When the primary transformer current reaches the reflected current of $i_2$, diode $D_2$ is blocked and the inductor $L_2$ is charged. At $t=t_2$, switch $S_3$ is turned ON with ZCS, because $D_4$ is reverse-biased and no current can go through $S_3$ until $S_2$ is turned OFF. When the capacitance of $C_{D4}$ is greater than that of $C_{S3}$, switch $S_3$ can be also turned ON at ZVS.

Mode 3 [$t_3, t_5$]: At $t=t_3$, when $S_2$ is turned OFF, the primary transformer current ip discharges $C_{S1}$ and charges $C_{S1}$. At $t=t_4$, the voltage across $C_{S1}$ is equal to the voltage across $C_2$, which forces the current to flow through $D_4$ and $S_3$. After this time, the transformer goes into a freewheeling interval. At the secondary side, inductor $L_1$ and $L_2$ currents freewheel through $D_1$ and $D_2$, respectively.

Mode 4 [$t_5, t_6$]: At $t=t_5$, $S_3$ is turned OFF, causing $C_{S2}$ and $C_{S3}$ to be charged and $C_{S1}$ to be discharged. When $C_{S1}$ is discharged to zero, the body diode of $S_1$ conducts to recycle the energy of the transformer leakage inductance.

Mode 5 [$t_6, t_7$]: At $t=t_6$, $S_1$ is turned ON with ZVS, and then the leakage inductance current is reset to zero and reverse-charged. When the transformer primary current ip increases to the reflected current of $i_1$ to the primary side, $D_1$ is blocked and the converter starts to deliver power to the output.

Because the load current reflected in the primary side is used to achieve the ZVS of $S_2$, the realization of ZVS is easy to obtain. ZVS of $S_1$ is achieved by the leakage inductance current. $S_3$ can be turned on at any time during the interval when $S_2$ is ON. Control signal of $S_3$ is easily obtained by inverting the gate (control) signal of $S_1$.

Since soft-switching is achieved for all switches, the switching losses are greatly minimized. Furthermore, the energy stored in the transformer leakage inductance is recycled to input DC bus or utilized for ZVS operation of the switches. Therefore, switching-frequency-related losses are reduced significantly, which provides converters potential to operate at higher frequencies and higher efficiency.

Comparing the novel control approach of the invention, the duty-cycle-shifted PWM control, with the conventional symmetric control, in the primary side, the switch voltage and current stresses are the same. Although the voltage waveform applied to the transformer is different, the voltage-second value and magnetizing B-H (flux density-magnetizing force) loop of transformer are the same. The peak and rms (root-mean-square) values of input and output currents flowing through the transformer are also the same for both schemes. Hence, the invented duty-cycle-shifted control and the invented full soft-switching topology make no difference in the characteristics and design of the isolation transformer compared to the conventional scheme.

On the secondary side, even though the currents through rectifiers (diodes) have different waveforms in the two control approaches, the peak and rms values of the waveforms are equal. Moreover, the inductors voltage-second value and current peak and rms values are the same for both control approaches, hereinafter called schemes.

Therefore, the voltage and current stresses for the secondary-side switches and inductors are the same for both schemes. Consequently, there is no stress penalty added using the invention schemes. But, the advantage of minimizing the losses is achieved to operate at higher switching frequency with higher efficiencies. Operating at higher switching frequency is preferred for reasons such as minimizing the magnetic components and capacitors size to achieve higher power density. Operating with higher efficiencies reduce the heat generated by the converter and allows higher power density and smaller size packaging.

To experimentally verify the improvement made by this invention, a prototype with 3.3V output voltage, 25 A full-load current, and 36V–75V input voltage range was built to evaluate the two methods of this invention, namely, the duty-cycle-shifted PWM control method, and the new full soft-switching topology with the additional switching network. It must be noted that the objective of this prototype is to compare the conventional method of the prior art to the invention methods relative to each other under the same experimental conditions, and it is not to limit the performance of this invention to the results obtained by this prototype since better results can be achieved using better devices and packaging techniques.

Using the same experimental prototype, three topology methods have been tested and evaluated: the conventional symmetric half-bridge of the prior art; the duty-cycle-shifted PWM controlled half-bridge of this invention; and, the duty-cycle-shifted PWM controlled new full soft switching half-bridge topology with the additional switching network. The resulting data is hereafter set forth in FIG. 6–FIG. 11.

Figure 6:
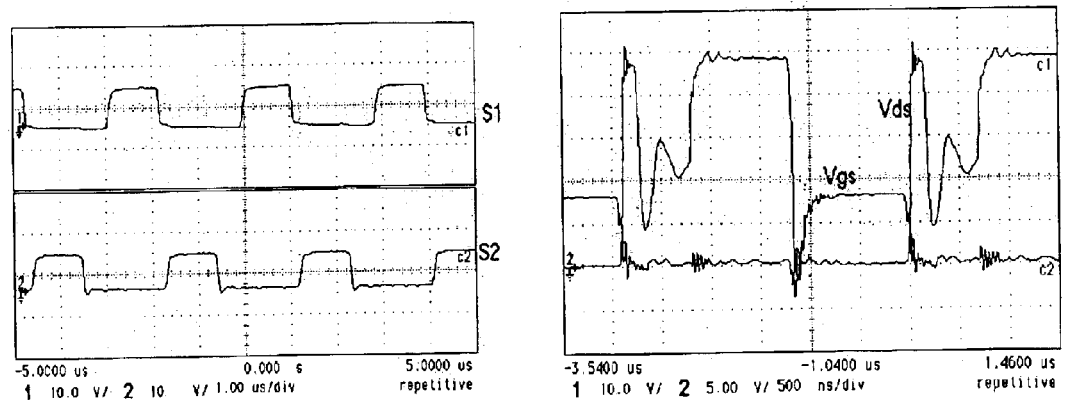
FIG. 6(a) shows the experimental Waveforms of the Switches of the Duty-Cycle-Shifted PWM Controlled Half-Bridge Gate (Control) Signals of $S_1$ and $S_2$.
FIG. 6(b) shows the experimental Waveforms of the switch of the Duty-Cycle-Shifted PWM Controlled Half-Bridge Gate (Control) Signal Zero-Voltage-Switching of $S_2$.

FIG. 6(a, b) shows the experimental waveforms of the primary-side switches when duty-cycle-shifted control scheme of the invention is applied to the half bridge. FIGS. 6(a) and (b) show gate (control) signals for both switches $S_1$ and $S_2$, and zero-voltage-switching waveforms of $S_2$, respectively.

Figure 7:
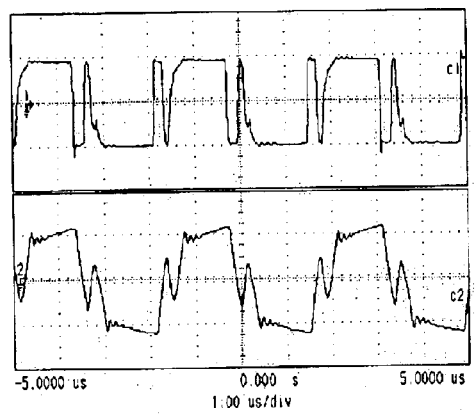
FIG. 7(a) shows waveforms of the Transformer Primary Voltage and Current for a conventional Symmetric Half-Bridge.
FIG. 7(b) shows waveforms of the Transformer Primary Voltage and Current for the Duty-Cycle-Shifted Controlled Half-Bridge of the Invention.
Figure 7:
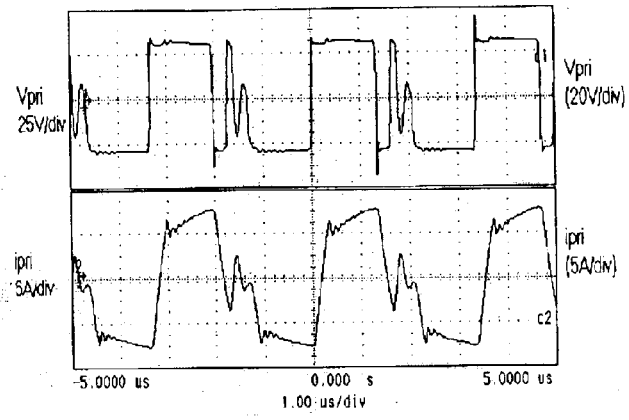

FIG. 7(a,b) shows the transformer primary voltage and current at full load with 48V input voltage in both cases when the conventional symmetric control of the prior art is used (see FIG. 7(a)) and when the duty-cycle-shifted control of the invention is applied to the half-bridge (see FIG. 7(b)).

Figure 8:
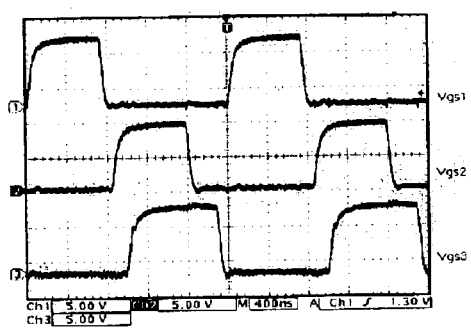
FIG. 8(a) shows Gate (Control) Signals for the Soft-Switching Topology of the Invention at a Switching Frequency of 500 kHz.
FIG. 8(b) shows the Transformer Primary Voltage and Current Waveforms for the Soft-Switching Topology of the Invention at a Switching Frequency of 500 kHz.
Figure 8:
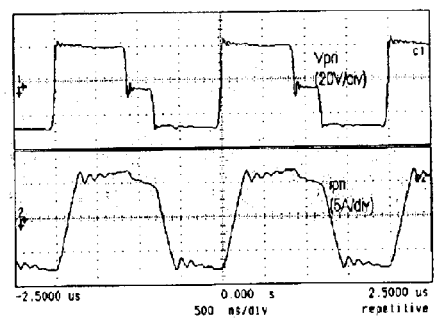

FIG. 8(a,b) shows the experimental gate signals of the primary-side switches (FIG. 8(a)) and transformer primary-side voltage and current waveforms (see FIG. 8(b)) at full-load at a switching frequency of 500 KHz for the new soft-switching topology with additional switching network of the invention.

Figure 9:
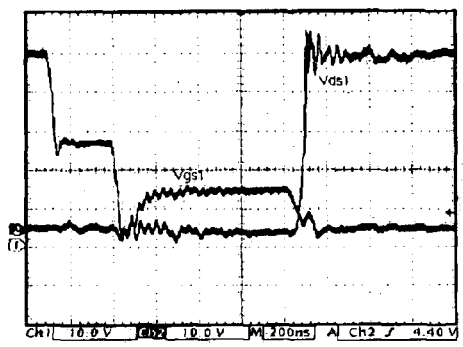
FIG. 9(a) shows Waveform for ZVS of Switch $S_1$ of the Soft-Switching Topology of the Invention at a Switching Frequency of 500 kHz.
FIG. 9(b) shows Waveform for ZVS of Switch $S_2$ of the Soft-Switching Topology of the Invention at a Switching Frequency of 500 kHz.
Figure 9B:
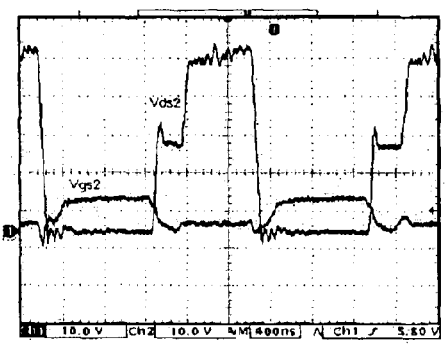

FIG. 9(a,b) shows the gate signals and drain-to-source voltage of switch $S_1$ (see FIG. 9(a)) and $S_2$ (see FIG. 9(b)) for the new soft-switching topology with additional switching network of the invention. It is clear that both $S_1$ and $S_2$ are turned ON at ZVS. The switching frequency is 500 KHz.

Figure 10:
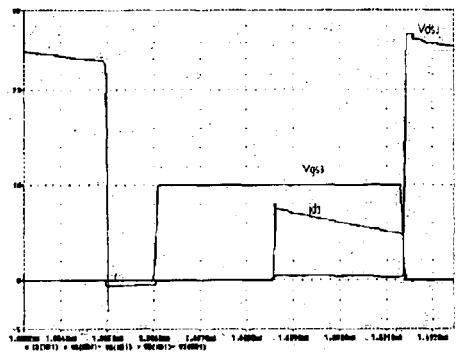
FIG. 10(a) shows Simulation waveforms of switch $S_3$ at ZVS and ZCS of the Soft-Switching Topology of the Invention at a Switching Frequency of 500 kHz.
FIG. 10(b) shows the Experimental waveforms of switch $S_3$ at ZVS and ZCS of the Soft-Switching Topology of the Invention at a Switching Frequency of 500 kHz.
Figure 10:
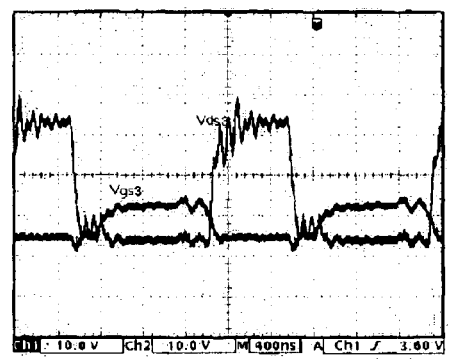

FIG. 10(a,b) shows the ZVS and ZCS switching of switch $S_3$. From the simulation waveforms of FIG. 10(a), $S_3$ is turned ON at ZVS and ZCS. The ZVS of $S_3$ is also verified by the experimental waveforms shown in FIG. 10(b). Consequently, experimental waveforms verify that all primary-side switches operate at ZVS, and leakage-inductance-related ringing and reverse recovery problem in the primary side are greatly reduced. Therefore, higher efficiency and the ability for operation at higher switching frequency is obtained with the topology and control scheme of the two inventions. The switching frequency is at 500 KHz.

Figure 11:
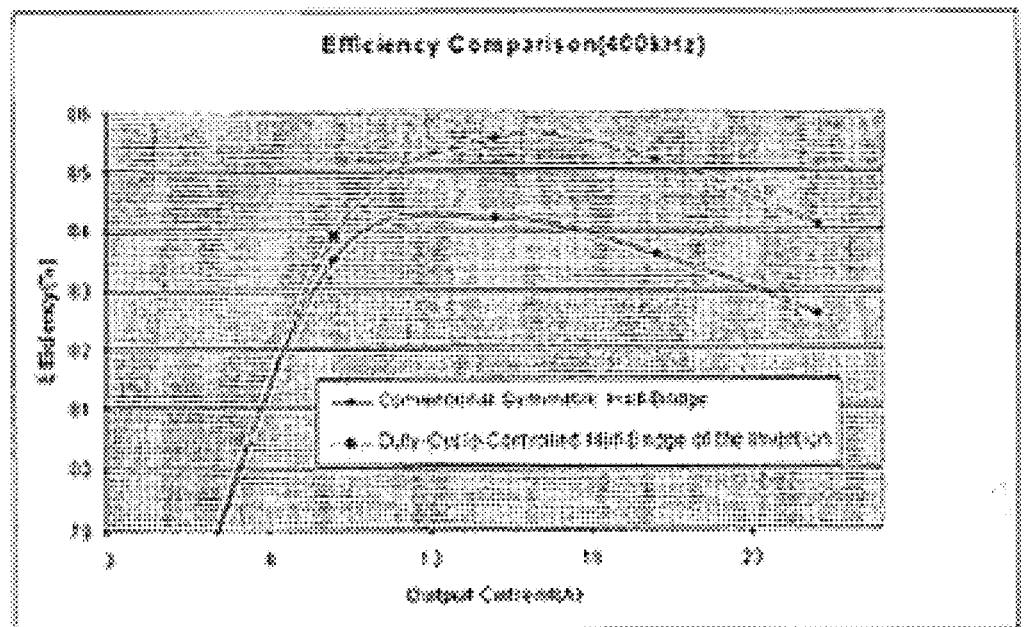
FIG. 11(a) shows Experimental Efficiency Comparison Curves Between the Conventional Symmetric Half-Bridge and the Duty-Cycle-Shifted PWM Controlled Half-Bridge of the Invention at a Switching Frequency of 400 kHz.
FIG. 11(b) shows Experimental Efficiency Comparison Curves Between the Conventional Symmetric Half-Bridge and the Soft-Switching Topology of the Invention at a Switching Frequency of 400 kHz.
Figure 11:
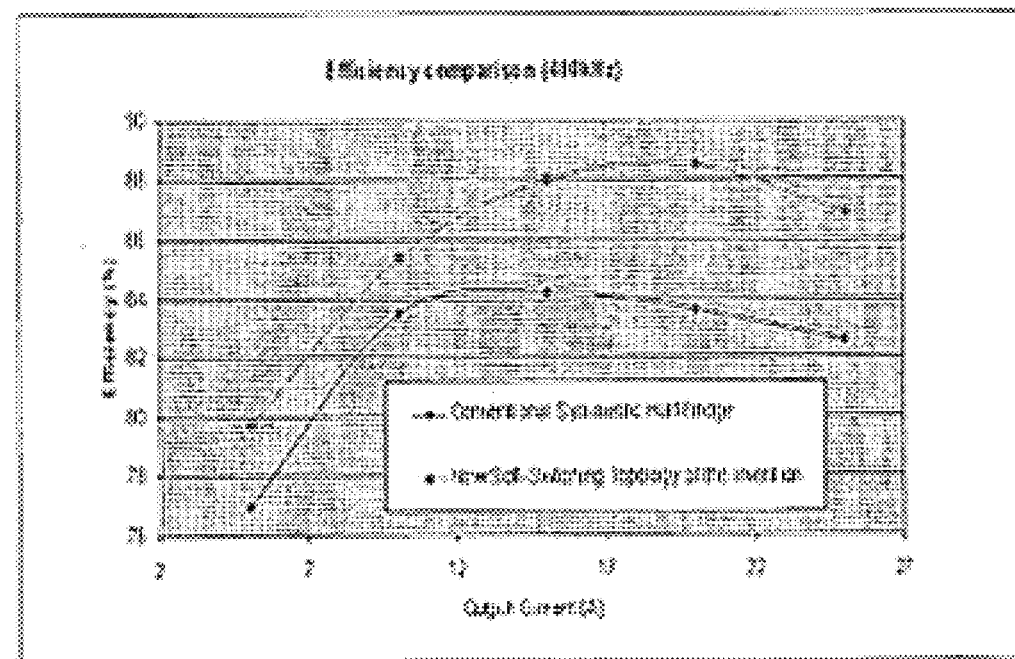

FIG. 11(a,b) shows plots of the experimental efficiency curves at a switching frequency of 400 KHz. FIG. 11(a) compares the efficiency between the conventional symmetric half-bridge and the duty-cycle-shifted PWM controlled half-bridge of the invention. FIG. 11(b) compares the efficiency between the conventional symmetric half-bridge and the new soft-switching topology of the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A half-bridge direct current to direct current(DC—DC) converter comprising:
   (a) means for receiving an input voltage (Vin);
   (b) means for outputting an output voltage (Vo);
   (c) two input capacitors;
   (d) an upper switch connected to one of said input capacitors and a lower switch connected to the other of said input capacitors:
   (e) a magnetic isolation transformer connected between said means for receiving an input voltage(Vin) input voltage and means for outputting an output voltage (Vo); and,
   (f) a secondary rectification circuit which bridges across said two input capacitors, wherein pulse width modulation of the upper switch is delayed at the falling edge of one signal while accelerating commencement of the rising edge of the lower switch.

2. The half-bridge DC—DC converter of claim 1 wherein the upper switch is turned ON directly after turning OFF the lower switch causing the upper switch to be turned ON after the voltage across it drops to zero.

3. The half-bridge DC—DC converter of claim 1 wherein the upper switch is turned ON directly after the voltage across it decays to zero whereby both its switching losses is reduced as well as said isolation transformer leakage inductance related losses.

4. The half-bridge DC—DC converter of claim 1 wherein pulse width modulation of the lower switch is delayed at the falling edge of one signal while accelerating commencement of the rising edge of the upper switch.

5. The half-bridge DC—DC converter of claim 1 wherein the lower switch is turned ON directly after turning OFF the upper switch causing the lower switch to be turned ON after the voltage across it drops to zero.

6. The half-bridge DC—DC converter of claim 1 wherein the lower switch is turned ON directly after the voltage across it decays to zero whereby both its switching losses is reduced as well as said isolation transformer leakage inductance related losses.

7. The half-bridge DC—DC converter of according to claim 1 wherein a third middle switch and diode is connected across the isolation transformer primary side between a connection node of the upper and lower switches and a connection node of the two input capacitors.

8. The half-bridge DC—DC converter of according to claim 7 wherein a control signal of pulse width modulation of the upper switch is delayed at the falling edge of one signal while accelerating commencement of the rising edge of the lower switch while the middle switch is driven by a control signal that turns it ON any time during the ON period of the upper switch, and turns it OFF just before turning ON the lower switch.

9. The half-bridge DC—DC converter of according to claim 7 wherein the upper switch is turned ON directly after turning OFF the lower switch causing the upper switch to be turned ON after the voltage across it drops to zero while the middle switch is driven by a control signal that turns it ON any time during the ON period of the upper switch, and turns it OFF just before turning ON the lower switch.

10. The half-bridge DC—DC converter of according to claim 7 wherein the upper switch is turned ON directly after the voltage across it decays to zero whereby both its switching losses is reduced as well as said isolation transformer leakage inductance related losses while the middle switch is driven by a control signal that turns it ON any time during the ON period of the upper switch, and turns it OFF just before turning ON the lower switch.

11. The half-bridge DC—DC converter of according to claim 7 wherein said middle switch is turned ON after both the voltage and current across it and through it decays to zero whereby it results in both Zero-Current Switching (ZCS) and Zero-Voltage Switching (ZVS) turn ON condition.

12. A method of driving a half bridge zero-voltage-switching (ZVS) direct current to direct current converter comprising the steps of:
   modifying pulse width of individual control pulses within a dead time of a control signal, wherein said converter is modified by an additional circuit across the input of an isolation transformer with a series connected auxiliary switch with its junction capacitor and connected diode with its junction capacitor to provide for ZVS.

13. The method of claim 12 wherein reversible means are provided for delaying pulse width modulation of a lower switch at a falling edge of one signal while accelerating commencement of a rising edge of an upper switch.

14. The method of claim 12 wherein pulse width modulation of the upper switch is delayed at the falling edge of one signal while accelerating commencement of the rising edge of the lower switch.

15. The method of claim 12 wherein the upper switch is turned ON directly after the voltage across it decays to zero whereby both its switching losses is reduced as well as said isolation transformer leakage inductance related losses.

16. The method of claim 12 wherein the upper switch is turned ON directly after the voltage across it decays to zero whereby both its switching losses is reduced as well as said isolation transformer leakage inductance related losses.

17. A half bridge zero voltage-switching (ZVS) direct current to direct current (DC—DC) converter comprising an additional circuit across the input of an isolation transformer with a series connected auxiliary switch with its junction capacitor and connected diode with its junction capacitor to provide for ZVS.

18. A half-bridge direct current to direct current(DC—DC) converter comprising:
   (a) means for receiving an input voltage (Vin);
   (b) means for outputting an output voltage (Vo);
   (c) two input capacitors;
   (d) an upper switch connected to one of said input capacitors and a lower switch connected to the other of said input capacitors:
   (e) a magnetic isolation transformer connected between said means for receiving an input voltage(Vin) input voltage and means for outputting an output voltage (Vo); and,
   (f) a secondary rectification circuit which bridges across said two input capacitors, wherein pulse width modulation of the lower switch is delayed at the falling edge of one signal while accelerating commencement of the rising edge of the upper switch.

19. A method of driving a half bridge zero-voltage-switching (ZVS) direct current to direct current converter comprising the steps of:
   delaying pulse width modulation of a lower switch at a falling edge of one signal while accelerating commencement of a rising edge of an upper switch.

* * * * *